United States Patent
Krishnan et al.

(10) Patent No.: US 10,202,081 B2
(45) Date of Patent: Feb. 12, 2019

(54) PACKAGE TRAY ASSEMBLY INCLUDING HIDDEN EXPANDABLE STORAGE SYSTEM

(71) Applicant: FORD GLOBAL TECHNOLOGIES, LLC, Dearborn, MI (US)

(72) Inventors: Venkatesh Krishnan, Canton, MI (US); Kathleen M. Parlow, Columbus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 14/870,296

(22) Filed: Sep. 30, 2015

(65) Prior Publication Data

US 2017/0088058 A1    Mar. 30, 2017

(51) Int. Cl.
| | |
|---|---|
| *B60R 7/00* | (2006.01) |
| *B60R 7/02* | (2006.01) |
| *B60R 5/04* | (2006.01) |

(52) U.S. Cl.
CPC .............. *B60R 7/02* (2013.01); *B60R 5/045* (2013.01)

(58) Field of Classification Search
CPC .. B60R 5/048; B60R 5/04; B60R 7/00; B60R 9/04; B60R 2011/04; B60R 7/005
USPC ................................. 224/537, 309
See application file for complete search history.

(56) References Cited

U.S. PATENT DOCUMENTS

| | | | | | |
|---|---|---|---|---|---|
| 2,483,478 A | * | 10/1949 | Smelker | ................ | E04H 15/06 135/143 |
| 3,456,979 A | * | 7/1969 | Hunter | ................ | B60P 3/341 296/170 |
| 3,473,680 A | * | 10/1969 | Downer | ................ | B60R 11/06 224/311 |
| 3,924,365 A | * | 12/1975 | Orberg | ................ | B60P 3/38 135/116 |
| 4,305,695 A | * | 12/1981 | Zachrich | ................ | B60P 1/00 296/37.1 |
| 4,531,646 A | * | 7/1985 | Howard | ................ | A47F 5/12 108/6 |
| 4,573,731 A | * | 3/1986 | Knaack | ................ | B60R 11/06 224/404 |
| 4,718,584 A | * | 1/1988 | Schoeny | ................ | B60R 7/02 217/12 R |

(Continued)

FOREIGN PATENT DOCUMENTS

| | | |
|---|---|---|
| DE | 102005051732 A1 | 5/2007 |
| DE | 102010046635 B4 | 11/2014 |

(Continued)

OTHER PUBLICATIONS

English Machine Translation of JP2002114103A.

(Continued)

*Primary Examiner* — Brian D Nash

(74) *Attorney, Agent, or Firm* — Vichit Chea; King & Schickli, PLLC

(57) ABSTRACT

A package tray assembly is provided for a motor vehicle. The package tray assembly includes a package tray having a vehicle forward end, a vehicle rearward end and a storage device. The storage device is carried on the underside of the package tray and has an opening oriented toward the vehicle rearward end of the package tray. That opening is easily accessed and is presented to the user when the lift gate is opened and the package tray is pivoted upwardly.

8 Claims, 4 Drawing Sheets

(56) References Cited

U.S. PATENT DOCUMENTS

| | | | | |
|---|---|---|---|---|
| 4,733,898 A * | 3/1988 | Williams | B62D 33/02 | 224/404 |
| 5,012,963 A * | 5/1991 | Rosenbaum | A61H 3/00 | 135/67 |
| 5,025,964 A * | 6/1991 | Phirippidis | A47F 3/14 | 211/126.1 |
| 5,040,711 A * | 8/1991 | Niederhauser | A01D 75/008 | 224/401 |
| 5,080,417 A * | 1/1992 | Kanai | B60R 5/04 | 296/37.14 |
| 5,090,856 A * | 2/1992 | Moore | B60R 21/06 | 180/271 |
| 5,094,375 A * | 3/1992 | Wright | B60R 7/02 | 224/404 |
| 5,368,210 A * | 11/1994 | Wotring | B60P 7/08 | 224/318 |
| 5,372,289 A * | 12/1994 | Dachicourt | B60R 7/02 | 224/281 |
| 5,469,999 A * | 11/1995 | Phirippidis | B60R 7/02 | 220/23.4 |
| 5,526,972 A * | 6/1996 | Frazier | B60R 7/02 | 220/529 |
| 5,535,931 A * | 7/1996 | Barlow | B60R 7/02 | 224/403 |
| 5,544,671 A * | 8/1996 | Phillips | B60P 3/341 | 135/150 |
| 5,626,380 A * | 5/1997 | Elson | B60R 7/02 | 296/37.1 |
| 5,628,442 A * | 5/1997 | Wayne | B60R 7/005 | 224/42.33 |
| 5,636,890 A * | 6/1997 | Cooper | B60R 7/02 | 29/401.1 |
| D383,112 S * | 9/1997 | Patterson | D12/415 | |
| 5,685,470 A * | 11/1997 | Moore | B60R 7/005 | 224/567 |
| 5,685,592 A | 11/1997 | Heinz | | |
| 5,772,370 A * | 6/1998 | Moore | B60R 7/005 | 296/37.16 |
| D397,322 S * | 8/1998 | Tobin | D12/414 | |
| 5,806,906 A * | 9/1998 | Hammond | B60J 1/2011 | 296/165 |
| 5,996,868 A * | 12/1999 | Paradis | B60R 9/00 | 224/404 |
| 6,039,378 A | 3/2000 | Bailey | | |
| 6,056,177 A * | 5/2000 | Schneider | B60R 5/04 | 220/4.28 |
| 6,062,452 A * | 5/2000 | Kauskey | B60R 7/02 | 224/402 |
| D426,187 S * | 6/2000 | Shultz | D12/414.1 | |
| 6,149,040 A * | 11/2000 | Walker | B60R 7/02 | 224/404 |
| 6,155,625 A * | 12/2000 | Felix | B60R 9/00 | 296/37.1 |
| 6,302,463 B1 * | 10/2001 | Moore | B60R 7/005 | 296/24.43 |
| 6,334,562 B1 * | 1/2002 | Ament | B60R 7/005 | 224/404 |
| 6,375,055 B1 * | 4/2002 | Spykerman | B60R 5/045 | 108/12 |
| 6,406,083 B2 | 6/2002 | Bharj et al. | | |
| 6,435,586 B2 * | 8/2002 | Getzschman | B60R 9/00 | 224/404 |
| 6,561,561 B2 * | 5/2003 | Getzschman | B60R 9/00 | 224/404 |
| 6,609,744 B2 * | 8/2003 | Gehring | B60R 7/02 | 220/531 |
| 6,623,060 B2 * | 9/2003 | Gehring | B60R 7/02 | 220/8 |
| 6,821,600 B1 | 11/2004 | Henson | | |
| 6,874,667 B2 * | 4/2005 | Dykstra | B60R 5/04 | 224/275 |
| 6,890,015 B2 | 5/2005 | Carlsson et al. | | |
| 7,028,872 B2 * | 4/2006 | Lobanoff | B60R 5/047 | 211/123 |
| 7,093,873 B2 * | 8/2006 | Nilsrud | B60R 7/02 | 296/37.14 |
| 7,097,224 B2 * | 8/2006 | Lester | B60R 9/00 | 224/404 |
| 7,121,601 B2 * | 10/2006 | Mulvihill | B60R 7/02 | 296/24.33 |
| 7,240,814 B2 * | 7/2007 | Holmberg | B60R 7/005 | 220/529 |
| 7,318,617 B1 * | 1/2008 | Scotton | B60R 5/045 | 224/484 |
| 7,488,024 B1 | 2/2009 | Medlar | | |
| 7,665,790 B2 * | 2/2010 | Oino | B60R 7/005 | 224/539 |
| 7,708,329 B2 * | 5/2010 | Duller | B60R 9/00 | 296/37.13 |
| 7,758,092 B2 * | 7/2010 | Kolpasky | B60R 7/02 | 296/24.43 |
| 7,762,602 B2 | 7/2010 | Bohlke et al. | | |
| 7,806,453 B2 * | 10/2010 | Aebker | B60R 5/045 | 296/37.16 |
| 7,886,948 B2 * | 2/2011 | Kerr | B60R 9/06 | 212/180 |
| 7,931,177 B2 * | 4/2011 | Bohlke | B60R 5/044 | 224/281 |
| 7,934,761 B2 | 5/2011 | Buehl et al. | | |
| 8,210,591 B2 * | 7/2012 | Martin | B60R 9/00 | 296/100.07 |
| 8,215,693 B2 * | 7/2012 | Ulita | B60R 7/02 | 296/37.1 |
| 8,757,695 B2 * | 6/2014 | Dinger | B60R 7/02 | 296/37.5 |
| 8,814,246 B2 * | 8/2014 | Weller | B60R 9/00 | 296/100.08 |
| 9,062,474 B2 * | 6/2015 | Ibrahim | E05B 7/00 | |
| 9,440,590 B1 * | 9/2016 | Huelke | B60N 3/00 | |
| 9,527,451 B2 * | 12/2016 | Krishnan | B60R 5/047 | |
| 9,682,733 B2 * | 6/2017 | Krishnan | B60J 7/1607 | |
| 2004/0050889 A1 * | 3/2004 | Shafer, Jr. | B60R 5/045 | 224/403 |
| 2004/0262345 A1 * | 12/2004 | Polburn | B60R 7/005 | 224/275 |
| 2006/0037484 A1 * | 2/2006 | Dixon | A47J 47/01 | 99/426 |
| 2006/0180623 A1 * | 8/2006 | Reynolds | B60R 5/04 | 224/542 |
| 2009/0026197 A1 * | 1/2009 | Chou | A45C 7/0036 | 220/9.2 |
| 2009/0045645 A1 * | 2/2009 | Bohlke | B60R 7/02 | 296/37.5 |
| 2009/0167043 A1 * | 7/2009 | Aebker | B60R 5/045 | 296/37.16 |
| 2009/0315358 A1 | 12/2009 | Kolpasky et al. | | |
| 2010/0307116 A1 * | 12/2010 | Fisher | B65D 51/28 | 53/492 |
| 2011/0101736 A1 | 5/2011 | Sogame | | |
| 2013/0249232 A1 | 9/2013 | Dinger et al. | | |
| 2016/0207467 A1 * | 7/2016 | Parlow | B60R 5/044 | |

FOREIGN PATENT DOCUMENTS

| | | |
|---|---|---|
| EP | 1382490 A1 | 1/2004 |
| JP | H11123988 | 5/1999 |
| JP | 2002114103 A | 4/2002 |
| JP | 2006062485 | 3/2006 |
| KR | 19980039165 U | 9/1998 |
| WO | 2007104563 A1 | 9/2007 |

OTHER PUBLICATIONS

English Machine Translation of DE102010046635B4.
English Machine Translation of DE102005051732A1.
English Machine Translation of KR19980039165U.
English Machine Translation of WO2007104563A1.
English machine translation of EP1382490A1.

(56) References Cited

OTHER PUBLICATIONS

English machine translation of JP2006062485.
English machine translation of JPH11123988.
Search report dated Mar. 20, 2018 for TR patent application No. 2016/12915 filed Sep. 6, 2016.

* cited by examiner

PACKAGE TRAY ASSEMBLY INCLUDING HIDDEN EXPANDABLE STORAGE SYSTEM

TECHNICAL FIELD

This document relates generally to the motor vehicle equipment field and, more particularly, to a package tray assembly incorporating a hidden expandable storage system that is very easy to access and use.

BACKGROUND

Many sport-utility vehicles (SUVs) and crossover-utility vehicles (CUVs) are equipped with a lift glass on a lift gate and also with a cargo cover such as a rigid package tray. Typically, the package tray pivots at the front and is connected by one or more retention cords to the lift gate so that when the lift gate is opened, the package tray pivots upwardly to allow better access to the storage area. Such an arrangement may cause a number of potential issues that interfere with the efficient and effective use of the storage space provided behind the rear seats in these vehicles.

When carrying small groceries or other items, the user must either open the lift gate or release the cargo cover/package tray and then lean in from the lift gate with the list glass open. During this process, a user's clothes may come into contact with the lift gate which may be soiled by road grime and thus transfer road grime to those clothes. Further, the ergonomic reach is not the most convenient, particularly for shorter users.

Still further, storing small items such as groceries on the floor of the storage area, even using available partitions or nets, may not prevent delicate items such as bread, eggs and lightbulbs from being damaged.

This document relates to a new and improved package tray assembly including a hidden expandable storage system that is more reachable and readily presents itself to the user when the lift gate is opened.

SUMMARY

In accordance with the purposes and benefits described herein, a package tray assembly is provided for a motor vehicle. That package tray assembly comprises a package tray having a vehicle forward end and a vehicle rearward end and a storage device carried on the underside of the package tray. The storage device has an opening oriented toward the vehicle rearward end of the package tray.

More specifically, a pivot is provided adjacent the vehicle forward end of the package tray and the package tray is displaced about this pivot between a home position and a raised position. Further, at least one lift cord connects the package tray to the lift gate whereby the package tray is displaced about the pivot to the raised position when the lift gate is opened. Advantageously, this movement serves to present the storage device opening at a convenient and easily accessed angle for the user. In one possible embodiment, the storage device is expandable. Thus, the storage device may comprise a flexible netting system. The flexible netting system may include a front section, a bottom section, a right side section and a left side section forming a storage compartment. Further, the flexible netting system may additionally include at least one partition section so as to form multiple storage compartments.

A fastener is provided for securing the flexible netting system to the package tray. That fastener may comprise a plurality of hook and loop fasteners.

The storage device may be displaceable between a stowed position flat against the underside of the package tray and a deployed position projecting downwardly from the underside of the package tray. A retainer may be provided securing the storage device in the stowed position. In one possible embodiment, the retainer comprises at least one hook and loop fastener. In yet another possible embodiment, an access door is provided in the package tray overlying the storage compartment. That access door allows one to access the storage compartment from directly above the package tray if desired.

In the following description, there are shown and described several preferred embodiments of the package tray assembly. As it should be realized, the package tray assembly is capable of other, different embodiments and its several details are capable of modification in various, obvious aspects all without departing from the package tray assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the package tray assembly and together with the description serve to explain certain principles thereof. In the drawing figures.

Reference will now be made in detail to the present preferred embodiments of the center console assembly and console tray, examples of which are illustrated in the accompanying drawing figures.

DETAILED DESCRIPTION

Figure 1:
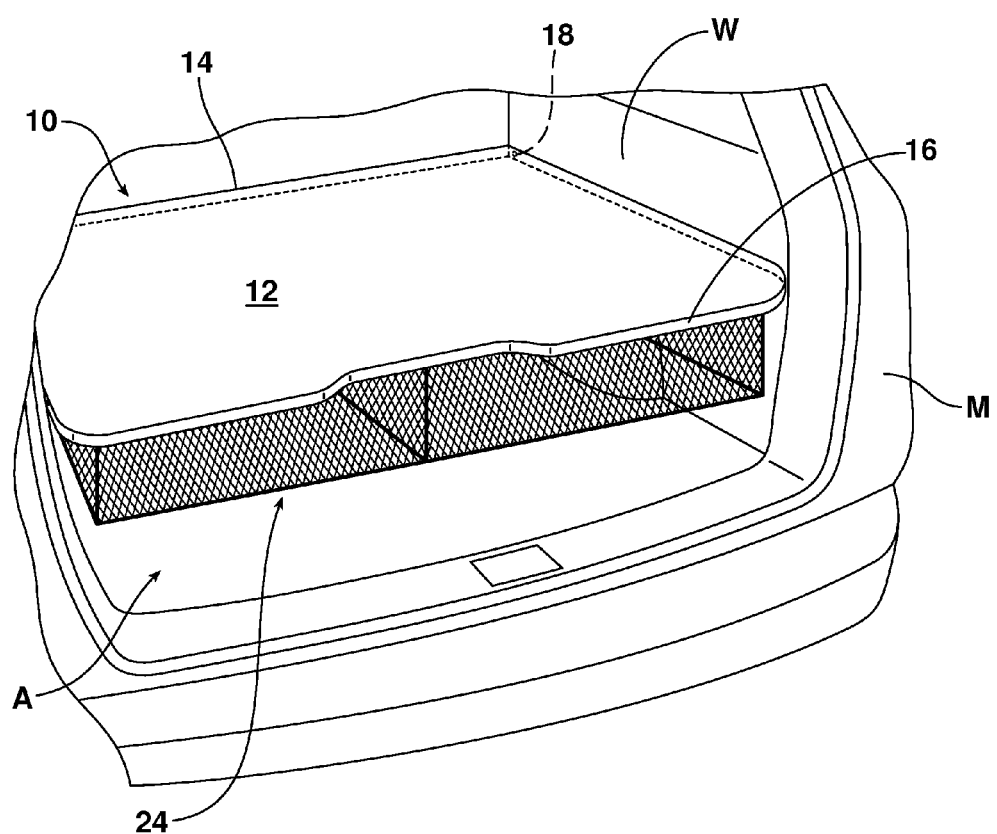
FIG. 1 is a perspective view of a motor vehicle equipped with the package tray assembly in a lowered or home position.
Figure 2:
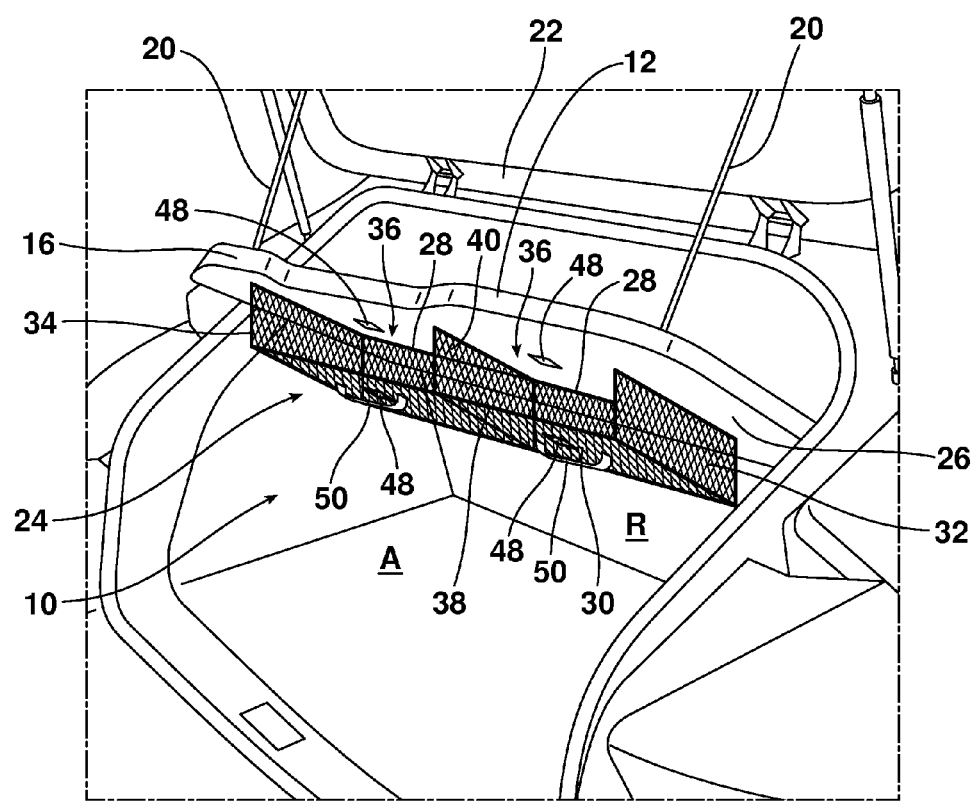
FIG. 2 is a view similar to FIG. 1 showing the package tray assembly in the raised position as well as the lift cords connecting the package tray to the vehicle lift gate.

Reference is now made to FIGS. 1-2, illustrating a motor vehicle M equipped with the package tray assembly 10 that is the subject matter of this document. As illustrated, the package tray assembly 10 includes a rigid package tray 12 that may, for example, be made from an appropriate polymer composite material. The package tray 12 has a vehicle forward end 14 and a vehicle rearward end 16. A pivot 18 adjacent the vehicle forward end 14 connects the package tray 12 to the side walls W of the motor vehicle storage area A. As illustrated in FIG. 2, opposed lift cords 20 are attached at first ends thereof to the package tray 12 adjacent the vehicle rearward end 16 and attached at second ends thereof to points (not shown) on the lift gate 22. During normal vehicle operation, the package tray 12 rests in the substantially horizontal position, concealing the storage area A behind the rear seats R of the motor vehicle M. In contrast, when the lift gate 22 is pivoted open, the package tray 12 pivots upwardly about the pivot 18 as a result of the connection between the package tray 12 and the lift gate 22 provided by the cords 20. See FIG. 2.

As further illustrated in FIGS. 1 and 2, the package tray assembly 10 also includes a storage device, generally designated by reference numeral 24. As illustrated, the storage device 24 is carried on the underside 26 of the package tray 12. In the illustrated embodiment, the storage device 24 comprises a flexible netting system. The flexible netting system 24 includes a closed front section 28, a bottom section 30, a right side section 32 and a left side section 34, forming a storage compartment 36. An opening 38 at the rear of the storage device 24 (i.e., oriented toward the rearward end 16 of the package tray 12) allows access to the storage compartment 36. Significantly, when the lift gate 22 is opened, the opening 38 is pivoted upwardly to present itself at a convenient and easily accessible angle so that a user may quickly and efficiently load items into or remove items from the storage compartment 36 as desired.

As also illustrated in FIGS. 1 and 2, the flexible netting system 24 may also include a partition section 40 dividing the storage device into multiple storage compartments 36. While only one partition section 40 is illustrated, it should be appreciated that substantially any number of partitions may be provided as desired.

As further illustrated in FIG. 5, an optional access door 42 may be provided in the package tray 12 overlying the storage device 24. That access door 42 may be opened in order to gain access to the storage compartment 36 when the package tray 12 is in the lowered position illustrated in FIG. 1. As should be appreciated, the access door 42 may be secured in a closed position by means of a hook and loop fastener 44, a zipper or another appropriate latching mechanism as known in the art.

Figure 3:
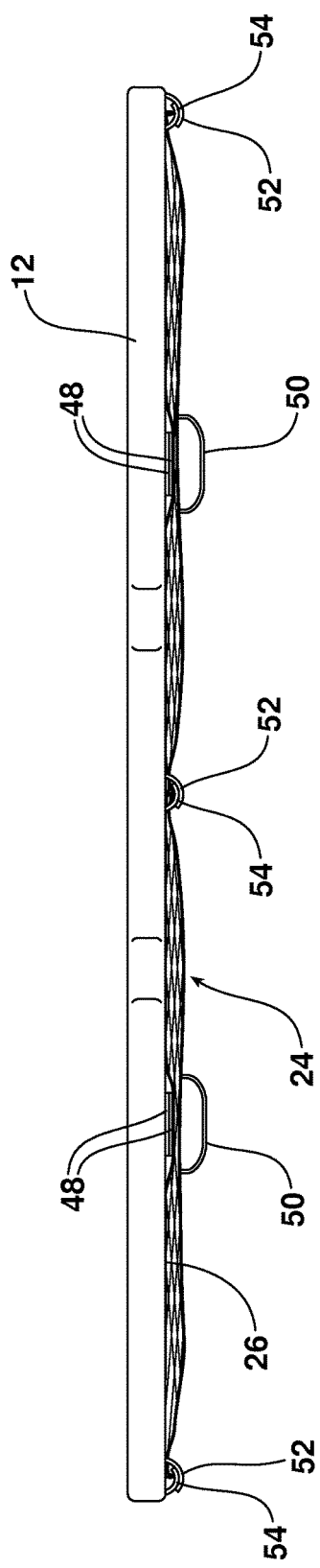
FIG. 3 is a detailed rear elevational view of the storage device/flexible netting system in the stowed position.

As should be appreciated from reviewing FIGS. 2 and 3, the flexible netting system 24 is selectively expandable and thus may be collapsed and held in a stowed position flat against the underside 26 of the package tray 12 (see FIG. 3) or displaced into a deployed position projecting downwardly from the underside 26 of the package tray 12 as illustrated in FIGS. 1, 2 and 5. A retainer 48, in the form of cooperating hook and loop fasteners, may be utilized to securely hold the storage device/flexible netting system 24 in the stowed position illustrated in FIG. 3. An operator may engage and pull down on the straps 50 to expand the flexible netting system 24 from the collapsed position to the fully expanded or deployed position.

Figure 4:
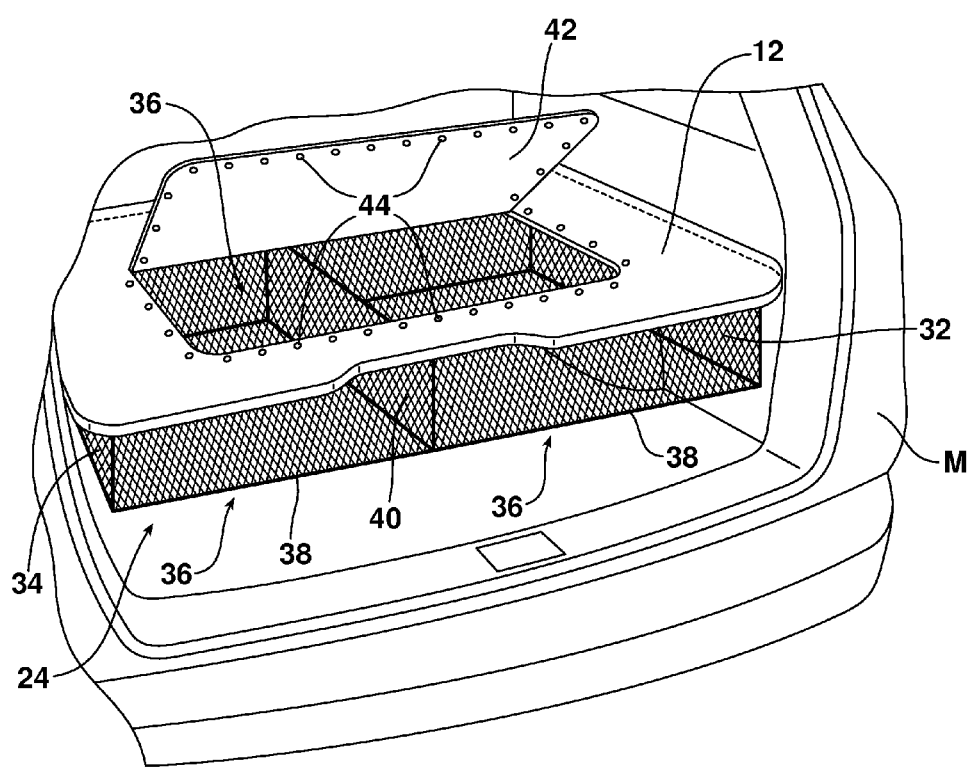
FIG. 4 is a perspective view of an alternative embodiment of the package tray assembly incorporating an upper access door or panel.

As illustrated in FIG. 4, a series of fasteners in the form of straps 52 with hook and loop fasteners 54 may be provided to secure the storage device/flexible netting system 24 to the package tray 12. Thus it should be appreciated that the fasteners 54 may be released to remove the storage device/flexible netting system 24 from the package tray 12 if desired.

As should be appreciated, the package tray assembly 10 described herein provides a number of benefits and advantages. The storage device 24 includes a rearwardly-oriented opening 38 which allows the user to conveniently access the storage compartment 36 when the lift gate 22 is opened and the package tray 12 is pivoted upwardly as illustrated in FIG. 2. More specifically, the storage device opening 38 is oriented at an angle that is easily accessible and may be used when placing items into or removing items from the storage compartment 36. Advantageously, the optional access door 42 in the package tray 12 allows the user to gain access to the storage compartment 36 when the lift gate 22 is closed and the package tray 12 is in its home or horizontal position overlying the storage area A. Thus it should be appreciated that, if desires, a user may simply open the lift glass on the lift gate 22 and then open the access door 42 to gain access to the storage compartment 36 underlying the package tray 12. As should be appreciated, this is a relatively short reach and is thus ideal for more ergonomic access to the contents of the storage compartment 36.

The foregoing has been presented for purposes of illustration and description. It is not intended to be exhaustive or to limit the embodiments to the precise form disclosed. Obvious modifications and variations are possible in light of the above teachings. For example, while the illustrated storage device 24 is a flexible netting system, other flexible storage devices may be utilized including, for example, one made from cloth or even one made with rigid accordion-like sidewalls and partition walls. Further, it should be appreciated that the storage device 24 may include a lid section to open and close the rearwardly-directed opening 38 as required or desired for a particular vehicle application. All such modifications and variations are within the scope of the appended claims when interpreted in accordance with the breadth to which they are fairly, legally and equitably entitled.

What is claimed:

1. A package tray assembly for in a motor vehicle, comprising: a motor vehicle storage area; a package tray concealing said motor vehicle storage area, said package tray having a vehicle forward end and a vehicle rearward end; a storage device carried on an underside of said package tray, said storage device having an opening oriented toward said vehicle rearward end, wherein said storage device comprises a flexible netting system, and wherein said flexible netting system includes a front section, a bottom section, a right side section, a left side section and at least one partition section so as to form multiple storage compartments; and further including a pivot adjacent said vehicle forward end connecting said package tray between sidewalls of said motor vehicle storage area and about which said package tray is displaced between a home position and a raised position.

2. The package tray assembly of claim 1, further including at least one lift cord connecting said package tray to a lift gate of said motor vehicle whereby said package tray is displaced about said pivot to said raised position when the lift gate is opened.

3. The package tray assembly of claim 1, further including a fastener for securing said flexible netting system to said package tray.

4. The package tray assembly of claim 3, wherein said fastener comprises a plurality of hook and loop fasteners.

5. The package tray assembly of claim 3, wherein said storage device is displaceable between a stowed position flat against said underside of said package tray and a deployed position projecting downwardly from said underside of said package tray.

6. The package tray assembly of claim 5, further including a retainer for securing said storage device in said stowed position.

7. The package tray assembly of claim 6, wherein said retainer comprises at least one hook and loop fastener.

8. The package tray assembly of claim 1, further including an access door on said package tray for accessing the multiple storage compartments of said storage device.

* * * * *